Aug. 27, 1935.   A. M. SIGNALNESS   2,012,896
UNDERCUTTER
Filed Aug. 14, 1934
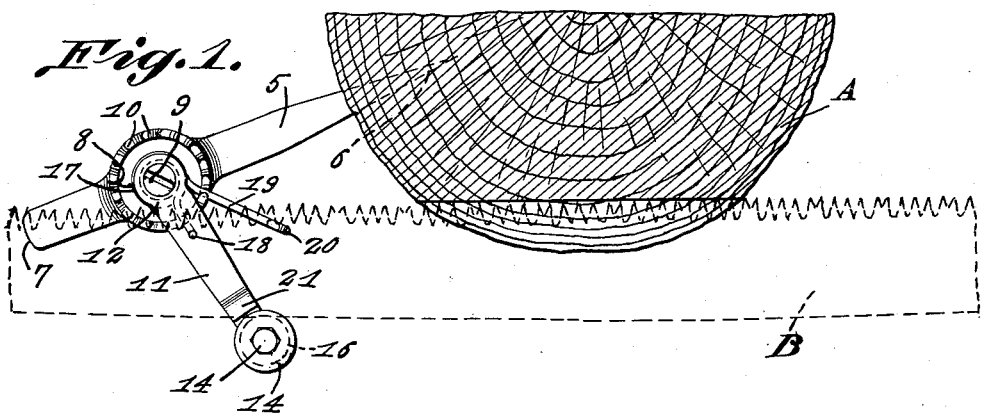
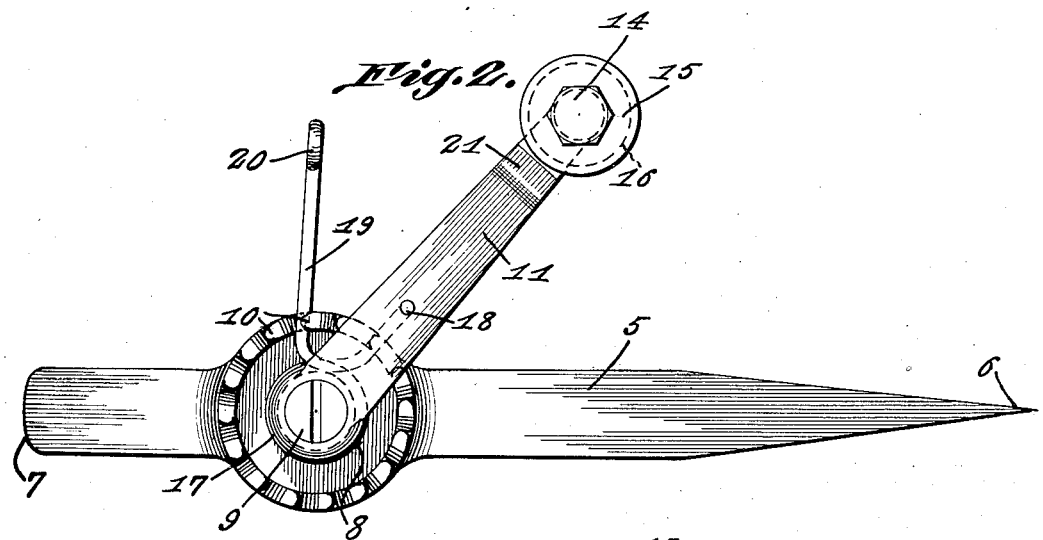
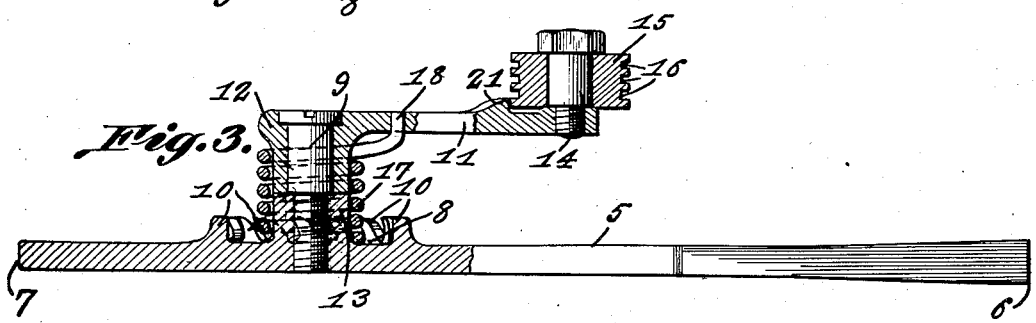
Alfred M. Signalness, INVENTOR
BY Victor J. Evans & Co.
ATTORNEY Patented Aug. 27, 1935

2,012,896

UNITED STATES PATENT OFFICE 2,012,896

UNDERCUTTER

Alfred M. Signalness, North Bend, Oreg.

Application August 14, 1934, Serial No. 739,772

2 Claims. (Cl. 143—163)

The invention relates to a saw guide and more especially to undercutters for cutting logs.

The primary object of the invention is the provision of a device of this character that will make possible the cutting of a log from the underside, so as to prevent splitting, or the pinching of the saw, such as usually attends the operation of cutting from the top side, the saw, during the cutting operation, being fed against the log to ensure positive cutting thereof and to relieve the operator from the labor imposed by such cutting.

Another object of the invention is the provision of an undercutter of this character, wherein the saw blade for the undercutting action is guided against the work, the guiding means for the saw blade being engaged selectively with the log for the proper cutting thereof and the said saw being tensioned for the proper feeding thereof in its cutting operation.

A further object of the invention is the provision of an undercutter of this character, wherein the make-up thereof is novel in form and is readily and conveniently applied to the work, such as a log, so that the latter can be successfully severed by an undercutting operation.

A further object of the invention is the provision of an undercutter of this character, wherein the tension upon the saw blade for the successful cutting action thereof can be regulated, the saw blade during its cutting operation being urged into the kerf cut thereby for a positive cut of the work under stroking action of the blade.

A still further object of the invention is the provision of an undercutter of this character which is extremely simple in construction, thoroughly reliable and efficient in its operation, readily and easily applied to and removed from the work, strong, durable, and inexpensive to manufacture.

With these and other objects in view, the invention consists in the features of construction, combination and arrangement of parts as will be hereinafter more fully described in detail, illustrated in the accompanying drawing, which discloses the preferred embodiment of the invention, and pointed out in the claims hereunto appended.

In the accompanying drawing:

Figure 1 is a fragmentary elevation of a log looking toward one end thereof and showing the undercutter constructed in accordance with the invention applied thereto.

Figure 2 is an enlarged side elevation of the device.

Figure 3 is a top plan view of the device, the same being partly broken away.

Similar reference characters indicate corresponding parts throughout the several views in the drawing.

Referring to the drawing in detail, A designates generally a portion of a log which is to be cut and B a cross cut saw blade, the latter being of conventional kind and a part of the undercutter constituting the present invention and hereinafter fully described.

The undercutter comprises a spike-like member 5 having the pointed end 6 and the opposite blunt end 7, while at an intermediate portion of this member 5 is formed a circular bearing 8 having threaded centrally therein a journal stud 9, while concentrically of this stud and formed with the bearing 8 is a circular series of ratchet teeth 10 for a purpose presently described.

Swingingly supported on the stud 9 is a guide arm 11 having the hub 12 confronting a hub formation 13 on the bearing 8, these hubs accommodating the stud 9.

Carried at the outer end of the arm 11 is the axle 14 for a guide wheel 15, its outer periphery having therein the spaced annular guide channels or grooves 16 in which is selectively engaged the heel edge of the cross cut saw blade B, as will be apparent from Figure 1 of the drawing, for the guiding of this blade during its cutting operation.

Surrounding the hubs 12 and 13 is a coiled spring 17, one end, as at 18, being fixed in the arm 11, while the other end 19 of this spring 17 serves as a hand lever latch for selectively engaging the ratchet teeth 10 for varying the tension of the spring 17 upon the arm 11, the end 19 being formed with the terminal handhold 20.

In the use of the undercutter the member 5 at its pointed end 6 is driven into the log A, for example, to assume the position as shown in Figure 1, and the arm 11 is turned on the stud journal 9 to have the wheel 15 engage against the heel edge of the saw blade B and thereafter the lever 19 is engaged with a selected tooth 10 according to the tension desired of the spring 17 against the arm 11 and thus the blade B will be urged against the log A under back and forth stroking action of said blade for the cutting of said log, it being apparent that the blade B will be guided in its stroke through the instrumentality of the channel or groove 16 in which said heel edge of the blade is seated in the wheel 15.

It should be obvious that by varying the tension of the spring 17 the urging action of the arm 11 against the heel edge of the saw blade B can be varied and this arm, under the spring action, functions as a follower for the said blade B during the cutting operation of the saw.

The arm 11 on that side next to the wheel 15 is formed with an overhang or projection 21 which extends over the wheel 15 at that side next to the arm to close the gap between the said arm and said wheel for avoiding the possibility of the saw blade working into the clearance therebetween and thus jamming the wheel 15 in its guiding action.

What is claimed is:

1. A device of the character described comprising a spike-like member for mounting in a log, a circular bearing on said member, ratchet teeth on said bearing, an arm pivoted centrally of said bearing, a guide wheel on the arm for engaging the heel edge of a saw blade for the guiding thereof under its cutting action, and a spring anchored to the arm and about the pivotal connection of the same with the bearing and adjustably engageable with the ratchet teeth for varying the tension of said spring and its action upon the arm.

2. A device of the character described comprising a spike-like member for mounting in a log, a circular bearing on said member, ratchet teeth on said bearing, an arm pivoted centrally of said bearing, a guide wheel on the arm for engaging the heel edge of a saw blade for the guiding thereof under its cutting action, a spring anchored to the arm and about the pivotal connection of the same with the bearing and adjustably engageable with the ratchet teeth for varying the tension of said spring and its action upon the arm, and a latching lever end on said spring for coaction with the ratchet teeth.

ALFRED M. SIGNALNESS.